US009850141B2

(12) United States Patent
Lin

(10) Patent No.: US 9,850,141 B2
(45) Date of Patent: Dec. 26, 2017

(54) FILTER HAVING AN AUTOMATIC CONTROL OF FLOW

(71) Applicants: Kemflo (Nanjing) Environmental Technology Co., Ltd., Nanjing (CN); Kemflo International Co., Ltd., Pingtung (TW); Chingshiung Lin, Pingtung (TW)

(72) Inventor: Jack Lin, Nanjing (CN)

(73) Assignees: Kemflo (Nanjing) Environmental Technology Co., Ltd. (CN); Kemflo International Co., Ltd. (TW); Ching Hsiung Lin (TW)

( * ) Notice: Subject to any disclaimer, the term of this patent is extended or adjusted under 35 U.S.C. 154(b) by 257 days.

(21) Appl. No.: 14/856,843

(22) Filed: Sep. 17, 2015

(65) Prior Publication Data

US 2016/0332100 A1    Nov. 17, 2016

(30) Foreign Application Priority Data

May 12, 2015    (CN) .................... 2015 2 0303862 U

(51) Int. Cl.
*B01D 35/143*    (2006.01)
*B01D 24/48*    (2006.01)
*C02F 1/00*    (2006.01)
*B01D 29/60*    (2006.01)

(52) U.S. Cl.
CPC ............ *C02F 1/003* (2013.01); *B01D 29/603* (2013.01); *B01D 35/143* (2013.01); *C02F 2209/40* (2013.01); *C02F 2209/445* (2013.01)

(58) Field of Classification Search
CPC    B01D 24/4861; B01D 29/603; B01D 35/143; B01D 35/157; B01D 35/30; C02F 1/003; C02F 2201/006; C02F 2209/44; C02F 2209/445

See application file for complete search history.

(56) References Cited

U.S. PATENT DOCUMENTS 4,698,164 A * 10/1987 Ellis ..................... B01D 35/157
                                                              210/100
4,772,386 A *  9/1988 Grout ................... B01D 35/143
                                                              210/100
2005/0178705 A1    8/2005 Broyles et al.

* cited by examiner

*Primary Examiner* — Terry K Cecil
(74) *Attorney, Agent, or Firm* — Roger D. Emerson; Emerson, Thomson & Bennett, LLC

(57) ABSTRACT

The present invention discloses a filter with an automatic control of flow, which contains a housing having a water inlet and a water outlet on one end, a bottom cover connecting to the other end of the housing and a filter material provided in the housing, comprising an outlet end fluidly connecting with the water outlet through a flow control unit. Based on the structure design of the flow control unit, the filter of the present invention can remind users to replace the filter materials in an easy and visible way at the time when the filter materials reach the end of working period.

4 Claims, 6 Drawing Sheets

US 9,850,141 B2

FILTER HAVING AN AUTOMATIC CONTROL OF FLOW

CROSS-REFERENCE TO RELATED APPLICATION

This application claims priority from and the benefit under 35 U.S.C. §119(a) of Chinese Patent Application No. 201520303862.1, filed on May 12, 2015, which is hereby incorporated by reference for all purposes as if fully set forth herein.

BACKGROUND OF THE INVENTION

1. Field of the Invention

The present invention relates to a water filter device, and more specially, to a filter having an automatic control of flow.

2. Description of the Prior Art

With the improvement of the quality of life, people are paying more attention to drinking water safety, so that water filters are widely used in daily life.

Principle of filtration is flowing raw water through filter materials to catch impurities so as to obtain drinking water. The filter materials will lose effectiveness after a predetermined quantity of raw water pass through (that is, at the time that maximum rated amount of treated water is reached). Serious secondary pollution will be caused if the raw water is treated by lapsed filter materials and therefore user's safety will be at risk. Accordingly, how to remind users to replace the filter materials in time has became a hotspot in this field.

Most of current filters fail to remind users to replace the filter materials in time due to absence of reminders. However, filters that have reminders require high cost to produce and electric power to maintain operation.

Therefore, we need a new kind of filter having a simpler structure and lower manufacturing costs, which can avoid safety risks by reminding users to replace the filter materials at the time when filter materials fail.

SUMMARY OF THE INVENTION

An objective of the disclosure is to provide a filter having an automatic control of flow, which can automatically reduce water yield in order to remind users to replace the expiring filter materials via the structure design of the flow control unit, so as to prevent users from unqualified drinking water.

For achieving the above-mentioned objective, the disclosure provides a filter having an automatic control of flow, which contains a housing having a water inlet and a water outlet on one end thereof, a bottom cover connected to the other end of the housing and a filter material provided in the housing, wherein the filter material comprises an outlet end that is fluidly connected with the water outlet through a flow control unit.

In one embodiment according to the present invention, the flow control unit comprises a connecting cap fluidly connected with the filter material, an end cap fluidly connected with the water outlet of the housing and a shell that provides a cavity and respectively connects with the connecting cap and the end cap, wherein a gear unit is disposed in the cavity.

In one embodiment according to the present invention, a first connecting portion is arranged on the axis of the connecting cap and is fluidly connected to the outlet end of the filter material.

In one embodiment according to the present invention, a flow regulating notch is formed on the end cap, a second connecting portion is arranged on one surface of the end cap to connect with the water outlet on the housing, and two gear shafts and a stopper are arranged on the other surface of the end cap.

In one embodiment according to the present invention, an outlet hole is also formed on the end cap.

In one embodiment according to the present invention, an inlet zone is defined at the junction of the shell and the connecting cap, and the gear unit disposed in the cavity is sheathed on the two gear shafts.

In one embodiment according to the present invention, a flow guiding plate is disposed above the inlet zone.

In one embodiment according to the present invention, the gear unit comprises a water sealing gear, a plurality of transmission gears and an impeller, wherein the water sealing gear is contacted with the end cap, a lug boss is disposed on the contacting surface between the water sealing gear and the end cap and is engaged with the flow regulating notch, and an annular groove formed on the water sealing gear is coupled with the stopper.

In one embodiment according to the present invention, the impeller and the water sealing gear are coaxially arranged.

In one embodiment according to the present invention, at least one groove is formed on the second connecting portion and a sealing ring is provided in each groove.

The present invention provides a simple and effective way to automatically determine whether the amount of the treated water is reached to the predetermined amount requiring a replacement of the filter materials through the structure design of the flow control unit, especially through the structure design of the gear unit, so that users can be reminded to replace the expiring filter materials.

The filter of the present invention can alert users to replace the filter materials in an easy and visible way at the time when the filter materials reach the end of working period.

Figure 1:
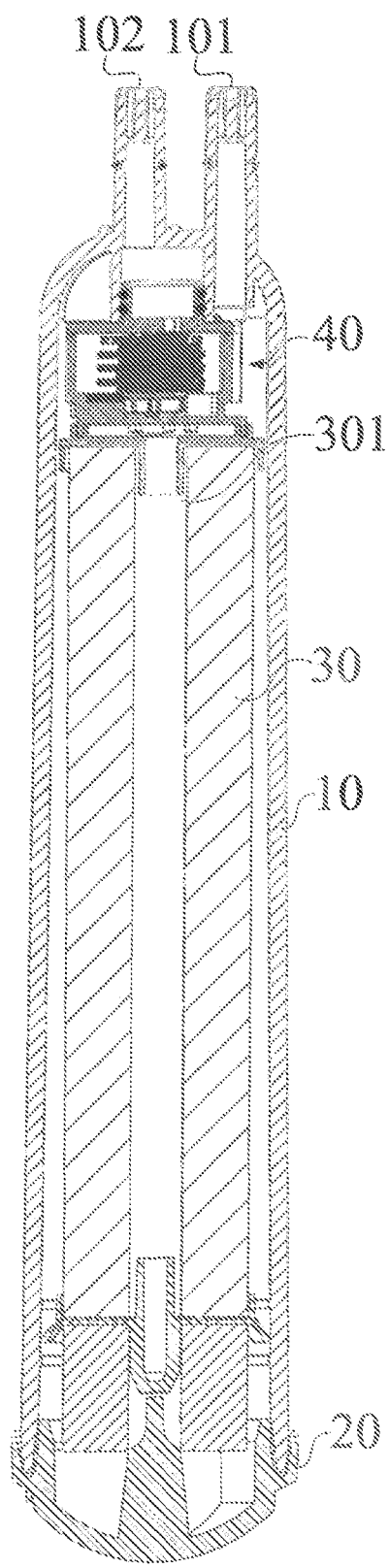
FIG. 1 is a cross-sectional view of a filter with an automatic control of flow according to the present invention.
Figure 2:
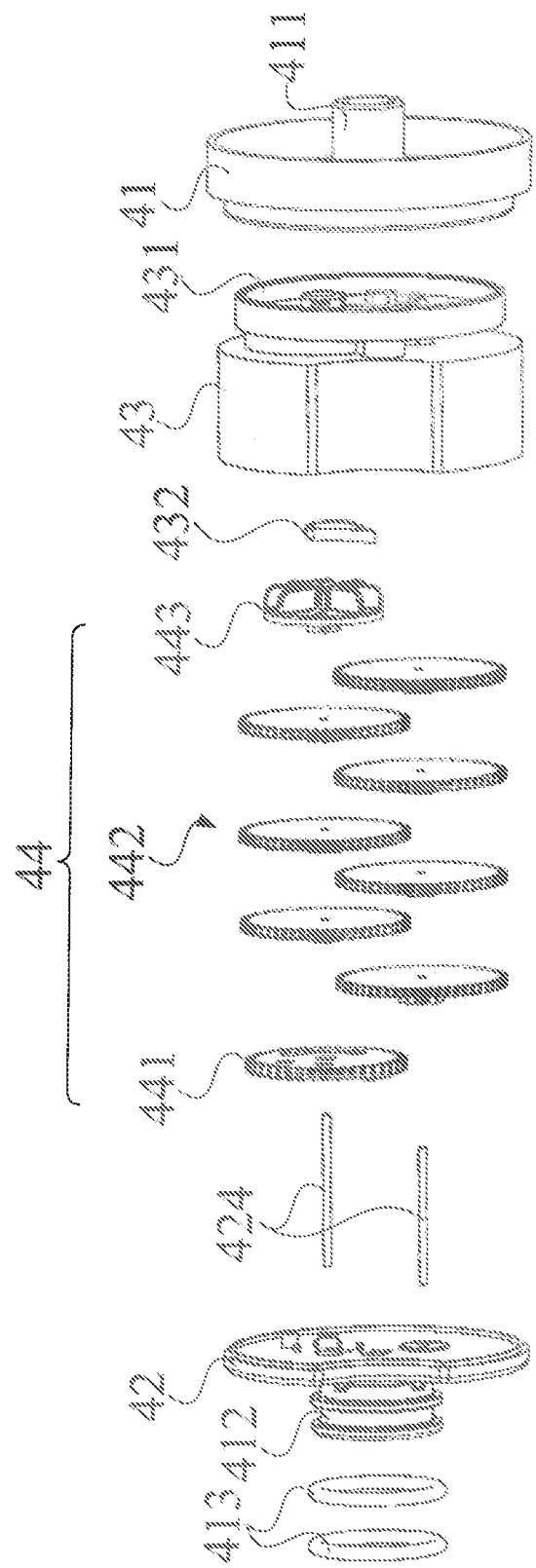
FIG. 2 is an exploded view of a flow control unit.
Figure 3:
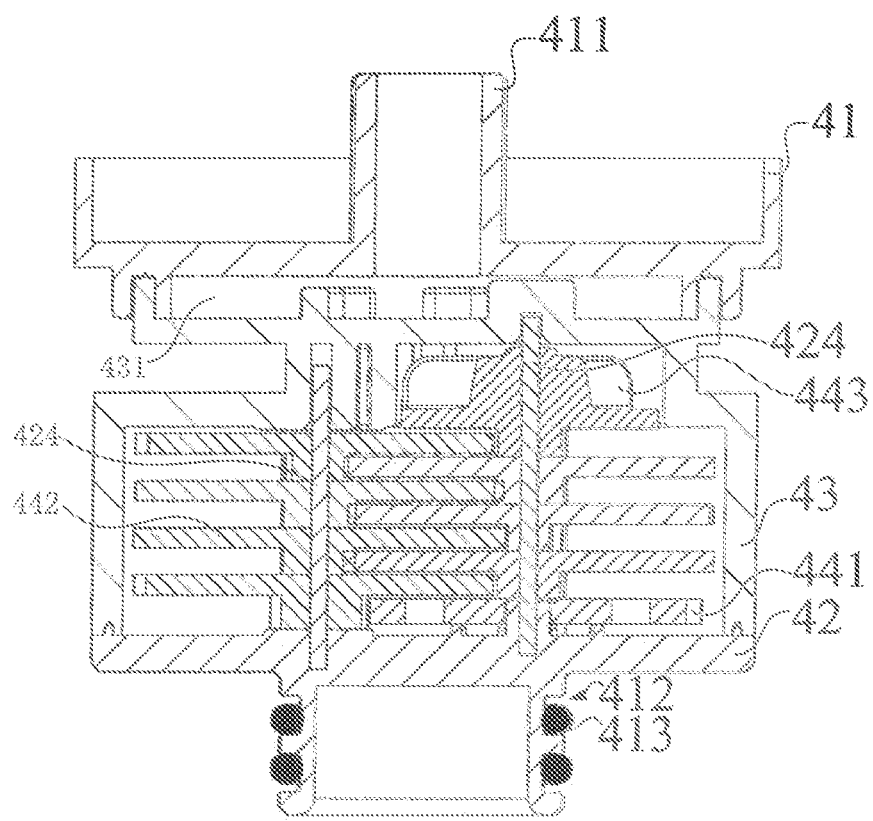
FIG. 3 is a cross-sectional view of the flow control unit.
Figure 4A:
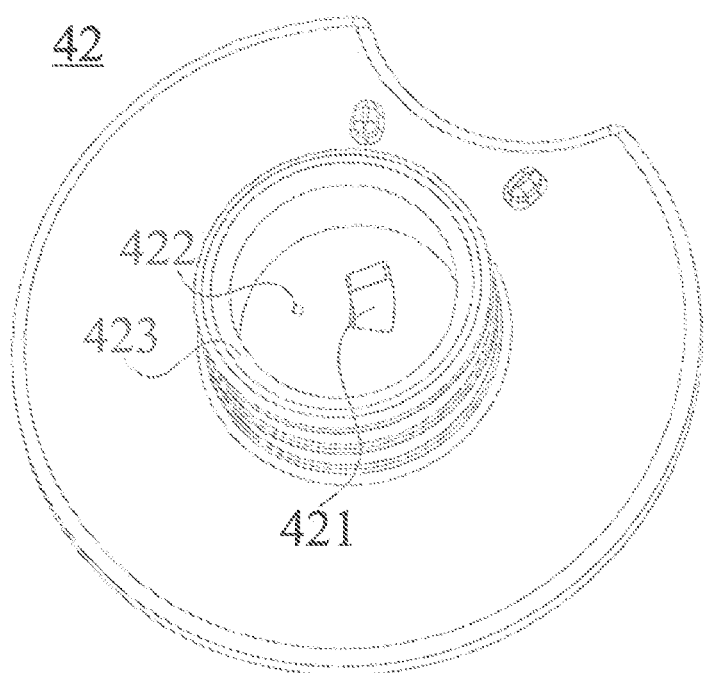
FIGS. 4A and 4B are schematic views of an end cap.
Figure 4B:
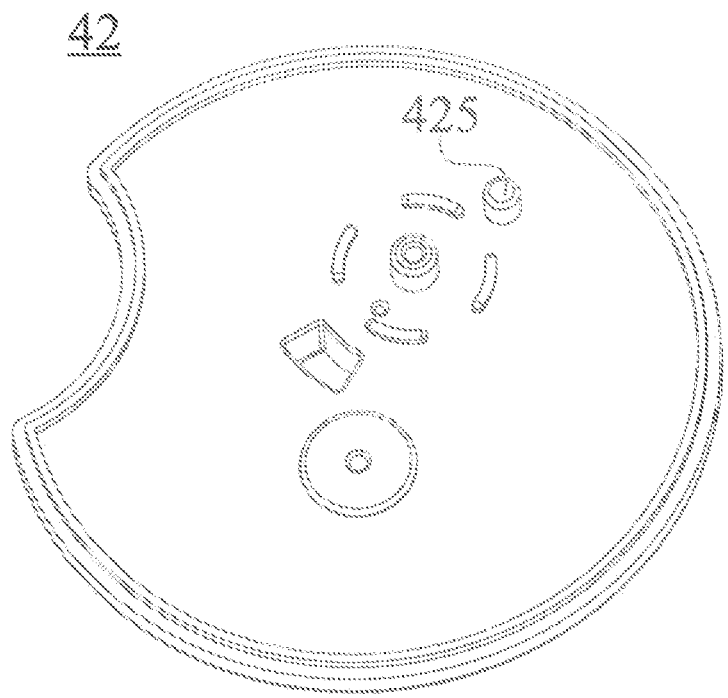
Figure 5A:
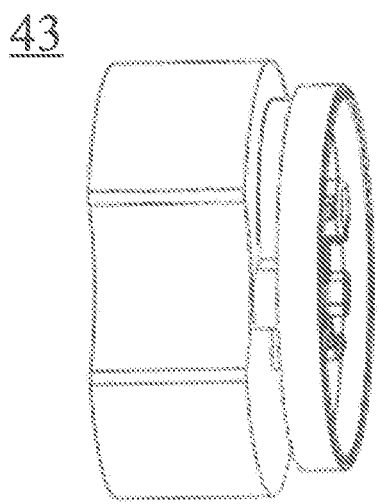
FIGS. 5A and 5B are schematic views of a shell.
Figure 5B:
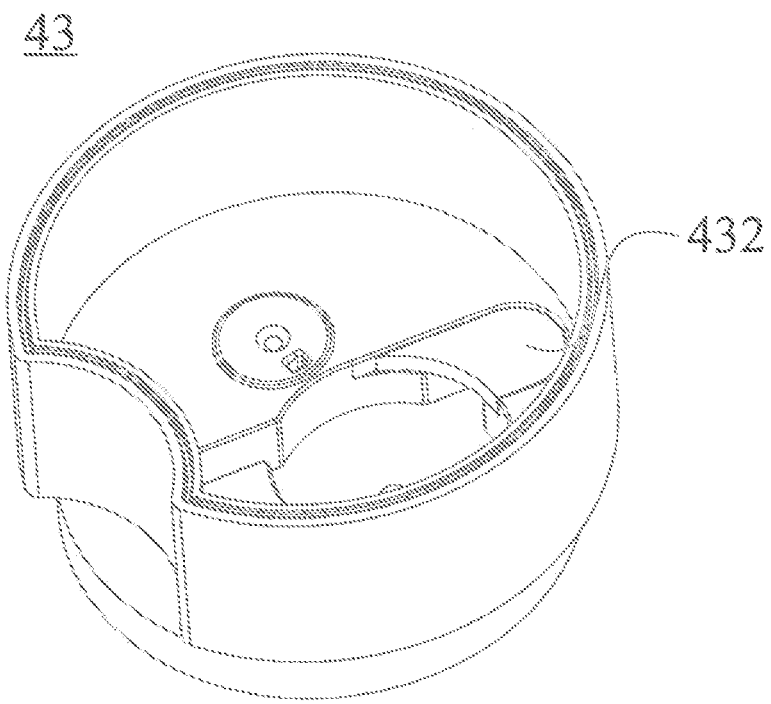
Figure 6A:
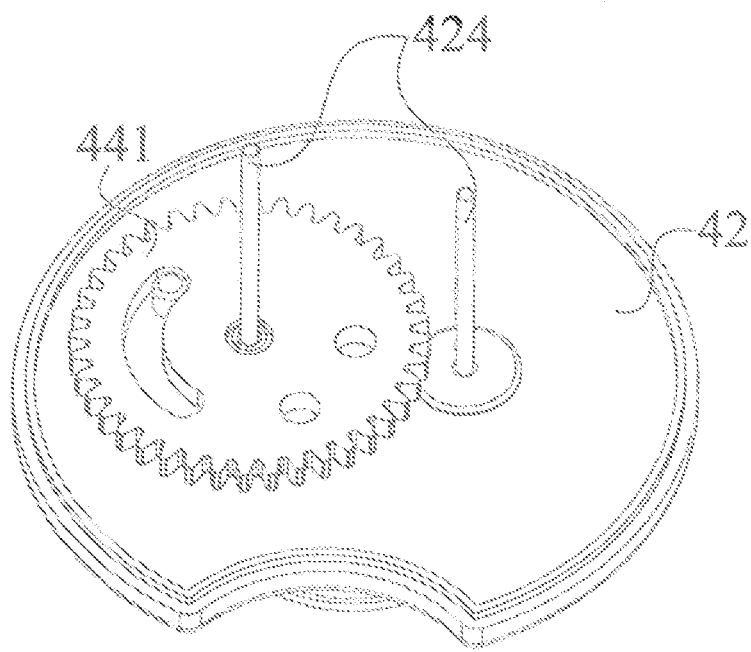
FIGS. 6A and 6B are schematic views of a water sealing gear.
Figure 6B:
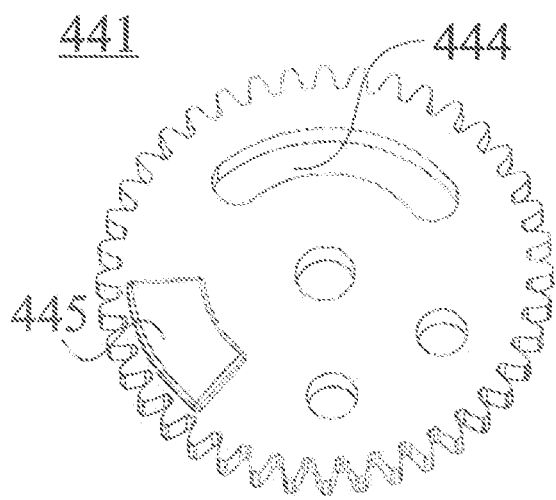

422: outlet hole;
423: second connecting portion;
424: two gear shafts;
425: stopper;
431: inlet zone;
432: flow guiding plate;
441: water sealing gear;
442: transmission gear;
443: impeller;
444: annular groove;
445: A lug boss

DETAILED DESCRIPTION OF THE PREFERRED EMBODIMENTS

Hereinafter, the foregoing objects, features, and advantages adopted by the present invention can be best understood by referring to the following detailed description of the preferred embodiments and the accompanying drawings. Furthermore, the directional terms described in the present invention, such as upper, lower, front, rear, left, right, inner, outer, side, etc., are only directions with reference to the accompanying drawings, so that the used directional terms are used to describe and understand the present invention, but the present invention is not limited thereto. In the drawings, units with similar structures use the same numerals.

First Embodiment

Refer now to FIG. 1, which is a cross-sectional view of a filter with an automatic control of flow according to the present invention. The filter contains a housing 10, a bottom cover 20 and a filter material 30. The filter material 30 is provided in the housing 10, a water inlet 101 and a water outlet 102 are provided on one end of the housing 10 and the bottom cover 20 is connected to the other end of the housing 10. The filter material 30 comprises an outlet end 301 that is fluidly connected with the water outlet 102 through a flow control unit 40.

Hereinafter, the flow control unit 40 will be described in detail by referring to the following detailed description and FIGS. 2 to 5B.

The flow control unit 40 comprises a connecting cap 41 fluidly connected with the filter material 30, an end cap 42 fluidly connected with the water outlet 102 of the housing 10, and a shell 43 that provides a cavity and respectively connects with the connecting cap 41 and the end cap 42, wherein a gear unit 44 is disposed in the cavity.

As shown in the FIGs, a first connecting portion 411 is arranged on the axis of the connecting cap 41 and is fluidly connected to the outlet end 301 of the filter material 30. At least two grooves 412 are formed on the connecting cap 41 and each groove is provided with a sealing ring 413. In this way, the connecting cap 41 is tightly connected with the first connecting portion 411.

As shown in the FIGs, a flow regulating notch 421 is formed on the end cap 42. In another embodiment, an outlet hole 422 is also formed on the end cap 42. A second connecting portion 423 is arranged on one surface of the end cap 42 to connect with the water outlet 102 on the housing 10, and two gear shafts 424 and a stopper 425 are arranged on the other surface of the end cap 42.

As shown in the FIGs, an inlet zone 431 is defined at the junction of the shell 43 and the connecting cap 41 and is fluidly connected with the first connecting portion 411, so that the treated water of the filter material can flow into the flow control unit 40. And as shown in the FIGs, the gear unit 44 disposed in the cavity is sheathed on the two gear shafts 424. A flow guiding plate 432 is disposed above the inlet zone 431 to guide the filtered water of the filter material so as to drive the impeller described below.

As shown in the FIGs, the gear unit 44 comprises a water sealing gear 441, a plurality of transmission gears 442 and an impeller 443.

The water sealing gear 441 is contacted with the end cap 41. A lug boss 445 is disposed on the contacting surface between the water sealing gear 441 and the end cap 41 and is engaged with the flow regulating notch 421, and an annular groove 444 formed on the water sealing gear 441 is coupled with the stopper 425. And as shown in the FIGs, the impeller 443 and the water sealing gear 441 are coaxially arranged.

Figure 7:
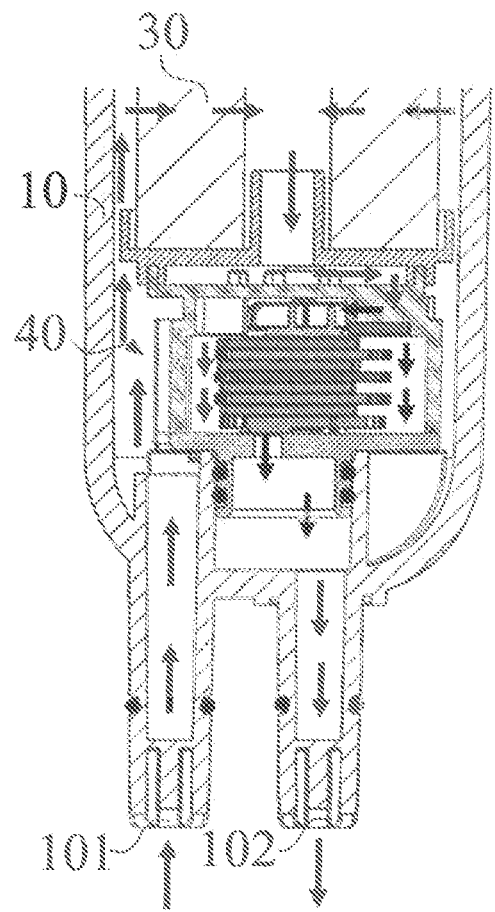
FIG. 7 is a partial enlarged cross-sectional view of the flow control unit, wherein, 10: housing;
20: bottom cover;
30: filter material;
40: flow control unit;
41: connecting cap;
42: end cap;
43: shell;
44: gear unit;
101: water inlet;
102: water outlet;
301: outlet end;
411: first connecting portion;
412: groove;
413: sealing ring;
421: flow regulating notch.

As shown in FIG. 7, arrows show the direction of water flow. When using the filter of the present invention, raw water is filtered by the filter material after flowing into the filter through the water inlet and then treated water flows into the flow control unit. Then, the treated water flows out the flow control unit through the flow regulating notch on the end cap, enters the water outlet of the filter and finally flows out the filter as drinking water. As indicated by the arrows, the impeller is driven by the treated water under the effect of the flow guiding plate and then the engaged transmission gear and water sealing gear are driven by the impeller, so that the lug boss on the water sealing gear moves close to the flow regulating notch on the end cap to close the flow regulating notch gradually. When the amount of the treated water is reached to the predetermined amount, the flow regulating notch will be closed completely by the lug boss on the water sealing gear and the water sealing gear will stop rolling due to the stopper, and then the quantity of drinking water will be reduced to achieve the purpose of reminding users to replace the expiring filter materials.

The present invention provides a simple and effective way to automatically determine whether the amount of the treated water is reached to the predetermined amount requiring a replacement of the filter materials through the structure design of the flow control unit, especially through the structure design of the gear unit, so that users can be reminded to replace the expiring filter materials.

The filter of the present invention can alert users to replace the filter materials in an easy and visible way at the time when the filter materials reach the end of working period.

The embodiment described in the present specification and the attached drawings are merely illustrative for describing part of the technical spirit included in the present invention. Accordingly, the embodiment disclosed in the present specification is not intended to be limiting but is merely a description of the technical spirit of the present invention. Thus, it is apparent that the scope of the technical spirit of the present invention is not limited by this embodiment. It should be interpreted that other modifications and specific embodiments which those with ordinary knowledge in the art can easily infer within the scope of the technical spirit included in the specification and drawings of the present invention also fall within the technical scope of the present invention.

What is claimed is:

1. A filter with an automatic control of flow, comprising a housing having a water inlet and a water outlet on one end thereof, a bottom cover connected to the other end of the housing and a filter material provided in the housing, wherein the filter material further comprises an outlet end fluidly connected with the water outlet through a flow control unit;

a first connecting portion is arranged on an axis of the connecting cap and is fluidly connected to the outlet end of the filter material;

the flow control unit comprises a connecting cap fluidly connected with the filter material, an end cap fluidly connected with the water outlet of the housing, and a shell that provides a cavity and respectively sealingly connects with the connecting cap and the end cap, wherein a gear unit is disposed in the cavity, a flow regulating notch is formed on the end cap, a second connecting portion is arranged on one surface of the end cap to connect with the water outlet on the housing, two gear shafts and a stopper are arranged on the other surface of the end cap, an inlet zone is defined at the junction of the shell and the connecting cap, and the gear unit disposed in the cavity is sheathed on the two gear shafts;

the gear unit comprises a water sealing gear, a plurality of transmission gears and an impeller, wherein the water sealing gear is contacted with the end cap, a lug boss is disposed on a contacting surface between the water sealing gear and the end cap and is engaged with the flow regulating notch, and an annular groove formed on the water sealing gear is coupled with the stopper.

2. The filter according to claim 1, wherein the impeller and the water sealing gear are coaxially arranged.

3. The filter according to claim 1 or claim 2, wherein at least one groove is formed on the second connecting portion and a sealing ring is provided in each groove.

4. The filter according to claim 1, wherein a flow guiding plate is disposed above the inlet zone.

* * * * *